United States Patent
Ohtake et al.

(10) Patent No.: US 6,747,715 B2
(45) Date of Patent: Jun. 8, 2004

(54) POLARIZED LIGHT REFLECTING ELEMENT, LIQUID CRYSTAL DISPLAY ELEMENT USING THE SAME, AND METHOD OF MANUFACTURING POLARIZED LIGHT REFLECTING ELEMENT

(75) Inventors: Toshiya Ohtake, Fukaya (JP); Yuzo Hisatake, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 217 days.

(21) Appl. No.: 09/987,477

(22) Filed: Nov. 14, 2001

(65) Prior Publication Data

US 2002/0067458 A1 Jun. 6, 2002

(30) Foreign Application Priority Data

Dec. 4, 2000 (JP) ........................................ 2000-368691

(51) Int. Cl.[7] ............................................. G02F 1/1335
(52) U.S. Cl. ........................................ 349/96; 349/133
(58) Field of Search .................... 349/96, 123, 125, 349/128, 133, 134, 135

(56) References Cited

U.S. PATENT DOCUMENTS

| | | | | | |
|---|---|---|---|---|---|
| 5,129,727 | A | * | 7/1992 | Hanyu et al. | 359/75 |
| 6,195,147 | B1 | * | 2/2001 | Asao et al. | 349/133 |
| 6,300,929 | B1 | * | 10/2001 | Hisatake et al. | 349/94 |
| 6,549,255 | B2 | * | 4/2003 | Stebler et al. | 349/127 |
| 6,630,974 | B2 | * | 10/2003 | Galabova et al. | 349/119 |
| 2002/0113923 | A1 | * | 8/2002 | Kashima et al. | 349/96 |
| 2003/0067572 | A1 | * | 4/2003 | Umeda et al. | 349/117 |
| 2003/0147030 | A1 | * | 8/2003 | Sone | 349/113 |

FOREIGN PATENT DOCUMENTS

| | | | |
|---|---|---|---|
| JP | 9-61822 | * | 3/1997 |
| JP | 2000-284127 | * | 10/2000 |

OTHER PUBLICATIONS

U.S. patent application Ser. No. 09/840,126, Ohtake et al., filed Apr. 24, 2001.
U.S. patent application Ser. No. 09/860,554, Ohtake et al., filed May 21, 2001.
U.S. patent application Ser. No. 09/499,696, Hisatake, filed Feb. 8, 2000.

* cited by examiner

*Primary Examiner*—Alexander Williams
*Assistant Examiner*—Ahmed N. Sefer
(74) *Attorney, Agent, or Firm*—Pillsbury Winthrop LLP

(57) ABSTRACT

A polarized light reflecting element includes a plurality of stacked cholesteric liquid crystal layers. Each cholesteric liquid crystal layer is polymerized and has a helical liquid crystal molecule array and a helical axis that extends substantially in the normal direction. The in-plane mean value α of the respective helix angles of liquid crystal molecules is nearly nπ (n=1, 2, 3, . . . ). The cholesteric liquid crystal layers have their liquid crystal molecules continuously oriented on the interfaces between them, and form one smooth helical structure as a whole.

8 Claims, 5 Drawing Sheets

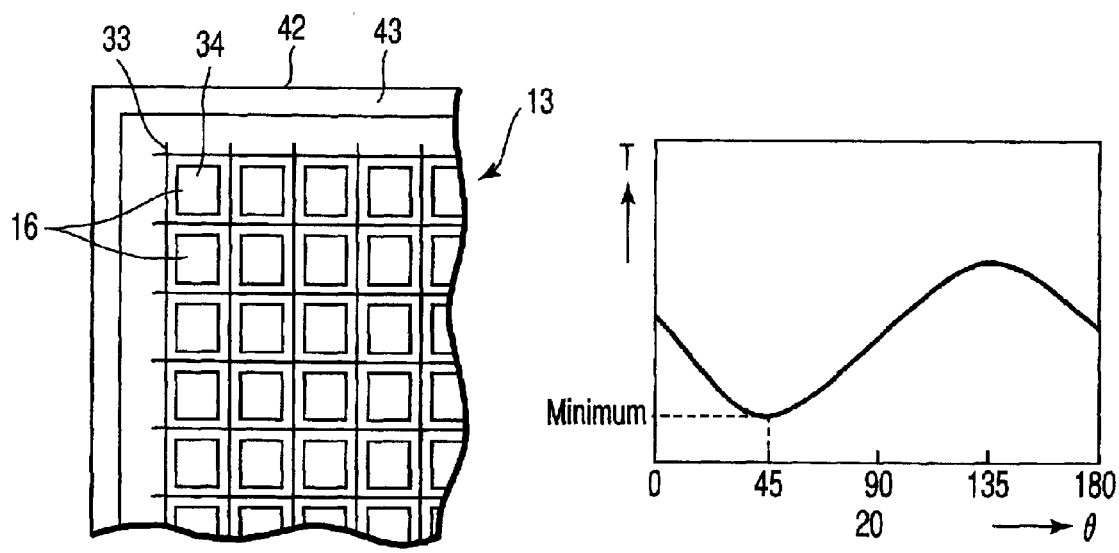
FIG. 8
FIG. 9
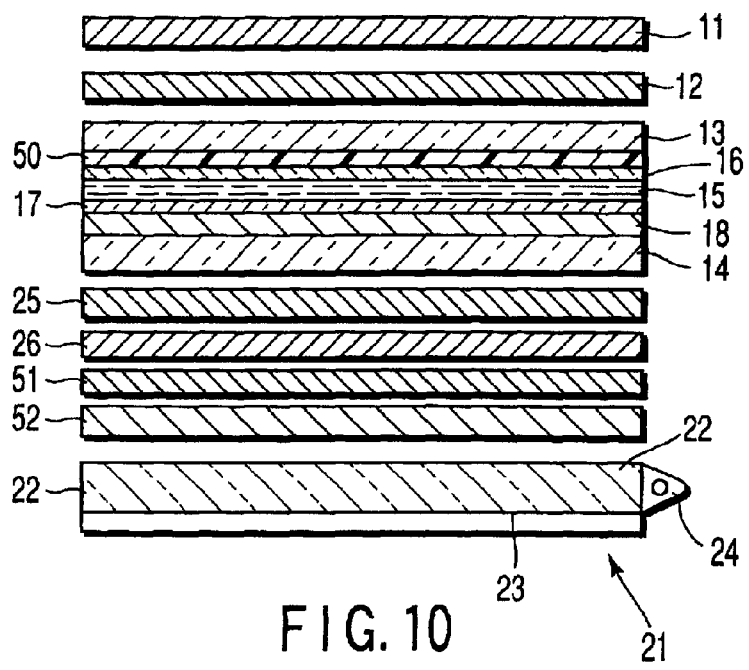
FIG. 10

POLARIZED LIGHT REFLECTING ELEMENT, LIQUID CRYSTAL DISPLAY ELEMENT USING THE SAME, AND METHOD OF MANUFACTURING POLARIZED LIGHT REFLECTING ELEMENT

CROSS-REFERENCE TO RELATED APPLICATIONS

This application is based upon and claims the benefit of priority from the prior Japanese Patent Application No. 2000-368691, filed Dec. 4, 2000, the entire contents of which are incorporated herein by reference.

BACKGROUND OF THE INVENTION

1. Field of the Invention

The present invention relates to a polarized light reflecting element, a liquid crystal display element including the polarized light reflecting element, and a method of manufacturing the polarized light reflecting element.

2. Description of the Related Art

It is generally known that a cholesteric or chiral-nematic liquid crystal film that has a helical molecule array and a helical axis extending substantially in the normal direction exhibits circular-polarization dichromatism. The term "circular-polarization dichromatism" means the character of the film that reflects those circularly polarized light components of incident light which have a specific wavelength and a specific direction and transmits circularly polarized light components in a direction opposite to the direction of the reflected light components.

The reflection and transmission characteristics for the circular-polarization dichromatism are settled depending on the helical structure of the liquid crystal used. Thus, the direction of the circularly polarized light to be reflected is coincident with the direction of helixes of the liquid crystal, and its wavelength depends on the pitch of the helixes. Further, the reflectance and transmittance change according to the thickness of the liquid crystal film. The thicker the film, the higher the reflectance is.

Polarized light reflecting elements with various polarized light reflection characteristics can be obtained by controlling the direction and pitch of the helixes of the liquid crystal film and the film thickness, taking advantage of the aforesaid characters. The polarized light reflecting elements can be applied to transmission- or half-transmission-type liquid crystal display elements that utilize circularly polarized light for display, and serve as useful luminance improving films for improving the utilization factor of a light source.

The degree of circular polarization of reflected and transmitted light is essential to the polarized light reflecting elements used for this purpose. Thus, if circularly polarized light in a direction opposite to a desired direction is mixed in the reflected and transmitted light, the resulting leakage light lowers the functions of the polarized light reflecting elements.

In the conventional polarized light reflecting elements, however, the degree of circular polarization of reflected and transmitted light is not high enough. If one such polarized light reflecting element is applied to a liquid crystal display element, therefore, leakage light increases to lower the contrast, so that the quality level of display of the display element lowers. If the reflecting element is used as a luminance improving film, moreover, the light utilization factor lowers inevitably. Thus, the function of the polarized light reflecting element cannot be used efficiently.

BRIEF SUMMARY OF THE INVENTION

The present invention has been contrived in consideration of these circumstances, and its object is to provide a polarized light reflecting element for improving the degree of circular polarization of reflected and transmitted light, thereby ensuring a high light utilization factor, a liquid crystal display element using the polarized light reflecting element, and a manufacturing method for the polarized light reflecting element.

In order to achieve the above object, a polarized light reflecting element according to an aspect of the present invention comprises at least one polymerized liquid crystal layer, cholesteric, chiral-nematic, or chiral, having a helical liquid crystal molecule array and a helical axis extending substantially in the normal direction, the in-plane mean value $\alpha$ of the respective helix angles of the liquid crystal molecules being given by $$n\pi - 0.05\pi \leq \alpha \leq n\pi + 0.05\pi \ (n=1, 2, 3, \ldots).$$

According to the polarized light reflecting element constructed in this manner, the degree of circular polarization of reflected and transmitted light can be drastically improved to ensure a high light utilization factor.

A half-transmission-type liquid crystal display element according to another aspect of the invention comprises a first polarization plate, a liquid crystal cell, a second polarization plate, and the polarized light reflecting element located between the first and second polarization plates.

Further, a liquid crystal display element according to still another aspect of the invention comprises a first polarization plate, a liquid crystal cell, a second polarization plate, a backlight source, the polarized light reflecting element located between the second polarization plate and the backlight source, and a $\lambda/4$-wavelength plate located between the second polarization plate and the polarized light reflecting element.

According to the liquid crystal display element constructed in this manner, high-contrast display characteristics can be obtained with use of the polarized light reflecting element that enjoys the high light utilization factor.

A method of manufacturing a polarized light reflecting element according to a further aspect of the invention comprises a process for forming an oriented film on a substrate, a process for orienting the oriented film so that liquid crystal molecules are controlled in one in-plane direction, a process for forming a liquid crystal layer having a helical structure on the oriented film, and a process for orienting and solidifying the liquid crystal molecules in the top portion of the liquid crystal layer in substantially the same direction as the direction of orientation of the oriented film.

Further, a method of manufacturing a polarized light reflecting element according to another aspect of the invention comprises a process for forming a first oriented film on a substrate, a process for orienting the first oriented film so that liquid crystal molecules are controlled in one in-plane direction, a process for forming a first liquid crystal layer having a helical structure on the first oriented film, a process for orienting and solidifying the top portion of the first liquid crystal layer in substantially the same direction as the direction of orientation of the first oriented film, a process for forming a second oriented film on the first liquid crystal layer, a process for orienting the second oriented film in substantially the same direction as the direction of orientation of the first oriented film, a process for forming a second liquid crystal layer on the second oriented film, and a process for orienting and solidifying the top portion of the second liquid crystal layer in substantially the same direction as the direction of orientation of the first oriented film.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently embodiments of the invention, and together with the general description given above and the detailed description of the embodiments given below, serve to explain the principles of the invention.

FIG. 8 is a plan view schematically showing the array substrate;

FIG. 9 is a diagram showing the relationship between the transmittance and the absorption axis angle of a polarization plate of the liquid crystal display element; and FIG. 10 is a sectional view of a liquid crystal display element according to a third embodiment of the invention.

DETAILED DESCRIPTION OF THE INVENTION

Polarized light reflecting elements according to embodiments of the present invention and liquid crystal display elements using the same will now be described in detail with reference to the accompanying drawings.

Figure 1:
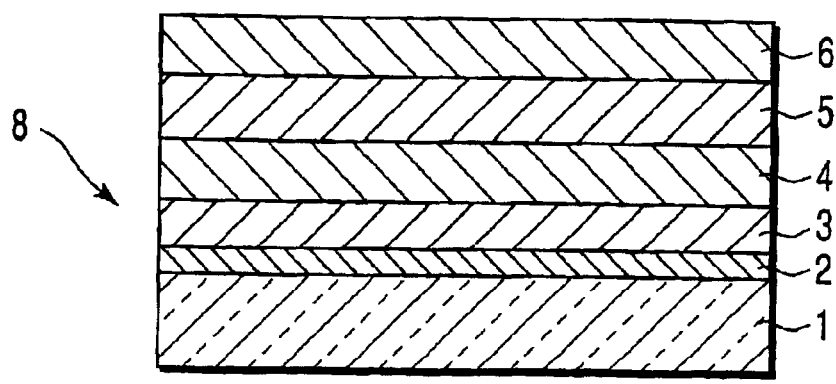
FIG. 1 is a sectional view of a polarized light reflecting element according to a first embodiment of present invention.

As shown in FIG. 1, a polarized light reflecting element 8 according to a first embodiment comprises a transparent substrate 1, an oriented film 2 on the transparent substrate 1, and a plurality of cholesteric liquid crystal layers 3, 4, 5 and 6 stacked on the oriented film 2.

The polarized light reflecting element 8 is manufactured in the following manner. First, polyimide is printed on the transparent substrate 1 and solidified by heat treatment. In this embodiment, a glass substrate is used as the transparent substrate 1. If the substrate 1 is expected to be light in weight or highly resistant to shock, however, it may be formed of plastics. Further, polyimide, which is expected only to serve for the orientation of a cholesteric liquid crystal, is conventional polyimide that is used in TFT and STN liquid crystal processes.

Then, the resulting polyimide layer is rubbed to form the oriented film 2. This rubbing process for orientation may be replaced with an optical orientation method in which linear polarized light is applied in a direction substantially coincident with the control azimuth, a diagonal vapor deposition method in which an inorganic material is deposited in a direction perpendicular to the control azimuth and in a diagonal direction parallel to the control azimuth, etc.

Subsequently, the cholesteric liquid crystal layer 3 is spread over the oriented film 2 by the spin-coating or printing method and solidified and polymerized by heat treatment. In the heat treatment, the resulting structure is sprayed with nitrogen gas in the same direction as the rubbing direction for the oriented film 2 as it is heated gradually. Thereupon, the liquid crystal molecules in the upper surface portion or top portion of the cholesteric liquid crystal layer 3 are oriented in the same direction as the rubbing direction for the oriented film 2 or with the liquid crystal molecules in the bottom portion of the layer 3. Thus, the polymerized cholesteric liquid crystal layer 3 is formed having a helical liquid crystal molecule array and a helical axis that extends substantially in the normal direction.

The direction of the liquid crystal molecules in the top portion of the cholesteric liquid crystal layer 3 may be settled by any other methods than the aforesaid one. In one of the alternative methods, the cholesteric liquid crystal layer 3 is rubbed after it is formed by coating and made semisolid at an appropriate temperature. In another method, the oriented film 2 is formed on a second substrate and rubbed, and the second substrate is then stuck on the cholesteric liquid crystal layer. After the second substrate is heat-treated, it is separated. In still another method, the transparent substrate 1 and the oriented second substrate are stuck on each other to form a cell with a spacer between them before a cholesteric liquid crystal is applied. As this is done, the cholesteric liquid crystal is injected and heat-treated, and the second substrate is then separated.

Thereafter, the cholesteric liquid crystal layers 4, 5 and 6 are successively formed over the cholesteric liquid crystal layer 3. In any of the cholesteric liquid crystal layers 3 to 6 formed in this manner, the liquid crystal molecules in the top and bottom portions are oriented in the same direction as the rubbing direction for the oriented film 2.

The twist of the cholesteric liquid crystal layers 3 to 6 may be right- or left-handed. In the present embodiment, however, they have a left-handed helical structure. To make the orientation perfect, a process may be repeated such that a oriented film is formed and rubbed after the formation of each cholesteric liquid crystal layer and a next cholesteric liquid crystal layer is then formed on the oriented film.

In this case, interface reflection of the incident light is caused by the difference in refractive index between each cholesteric liquid crystal layer and the oriented film. If this interface reflection occurs, a component that worsens the degree of polarization of emitted light develops. Therefore, the interface reflection should preferably be low.

Figure 2:
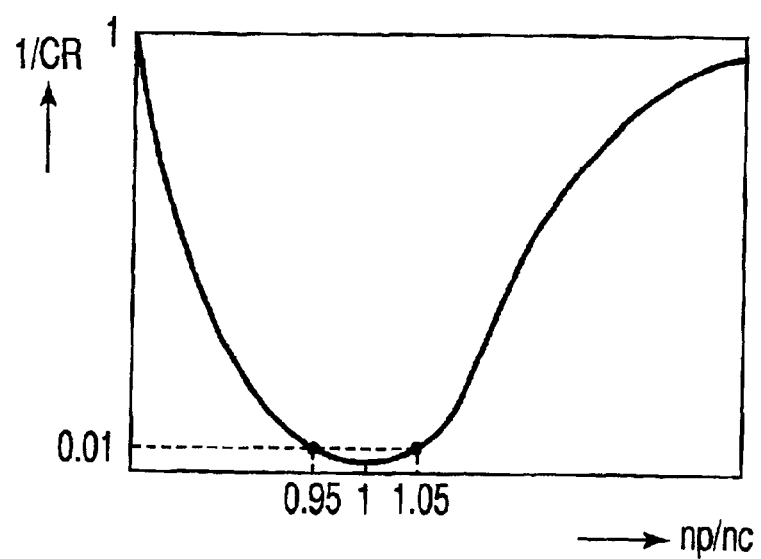
FIG. 2 is a diagram showing the relationship between the contrast of the polarized light reflecting element and the respective refractive indexes of each cholesteric liquid crystal layer and an oriented film.

FIG. 2 shows the relationship between the ratio between the refractive index nc of each of the cholesteric liquid crystal layers 3 to 6 and the refractive index np of the oriented film and the ratio (given by 1/CR) between left- and right-handed circularly polarized light components of the emitted light obtained when left-handed circularly polarized light is incident. As seen from FIG. 2, the value 1/CR increases so that the quality level of display worsens with distance from np/nc=1. If the value np/nc is not higher than 0.95 or not lower than 1.05, 1/CR>0.01 (CR<100) is given, so that the polarization characteristic is lowered considerably. Preferably, therefore, the respective refractive indexes of the stacked cholesteric liquid crystal layers and the oriented film should be restricted to a range from 90% to 105% compared with the refractive index of the cholesteric liquid crystal layer 3.

The oriented film 2 used in the present embodiment may be omitted in some cases. If the liquid crystal molecules of the cholesteric liquid crystal layer 3 on the side of the transparent substrate 1 can be oriented in a desired state by directly rubbing the surface of the substrate 1, for example, the oriented film 2 need not be formed.

If necessary, an overcoat layer may be provided on the top cholesteric liquid crystal layer 6.

A cholesteric liquid crystal selectively reflects only circularly polarized light beams in the same direction as the helical direction of the cholesteric liquid crystal, among other light beams of a specific wavelength λ (λ=nc·P) that is settled depending on a helix pitch P and the refractive index nc. The helical direction and the selective reflection wavelength λ can be set at appropriate values according to purposes. In the present embodiment, however, any of the cholesteric liquid crystal layers 3 to 6 has a left-handed helical structure, and their selective reflection wavelengths λ3, λ4, λ5 and λ6 are adjusted to λ3=450 nm, λ4=510 nm, λ5=570 nm, and λ6=630 nm, respectively. Thus, the resulting polarized light reflecting element 8 has a function for selective reflection of visible light beams with wavelengths in a wide range from 420 nm to 660 nm.

According to the present embodiment, moreover, the cholesteric liquid crystal layers are stacked in four layers. However, the number of layers is not limited to four, and one, two, or three layers or five or more layers may be used depending on the purpose.

If the cholesteric liquid crystal layers are made thick enough, they reflect all the specific circularly polarized light components (left-handed circularly polarized light components in this case) of light beams with wavelengths near the selective reflection wavelengths. If the layers are thin, they transmit some of the specific circularly polarized light components. The ratio between the reflected and transmitted light components can be freely set in accordance with the purpose of use of the polarized light reflecting element 8 and the environment.

The polarized light reflecting element 8 according to the present embodiment was utilized for a half-transmission-type liquid crystal display element, in particular, and was subjected to examinations for its visibility under various outdoor light conditions. Thereupon, it was confirmed that the reflection-transmission ratio of the element 8 can be set with a higher degree of freedom, since its efficiency of light utilization is higher than that of a conventional half-transmission-type liquid crystal display element. More specifically, it was found that the resulting liquid crystal display element can be readily used in the case where the reflection-transmission ratio ranges from 5:5 to 9:1.

If the reflection-transmission ratio is lower than 5:5, satisfactory reflection display cannot be enjoyed, so that the element is very awkward when it is used outdoors on a sunny day. If the reflection-transmission ratio is higher than 9:1, on the other hand, satisfactory transmission display cannot be enjoyed, so that the element cannot be used at night unless it is situated right under a light source such as a fluorescent lamp.

In the present embodiment, the thickness of each of the cholesteric liquid crystal layers 3 to 6 is set so that the reflection-transmission ratio of each layer is 7:3. Since the liquid crystal molecules in the top and bottom portions of each of the layers 3 to 6 are oriented in the same direction, their helix angle is n π (n=1, 2, 3, . . . ). In the present embodiment, the helix angle is 14π.

Figure 3:
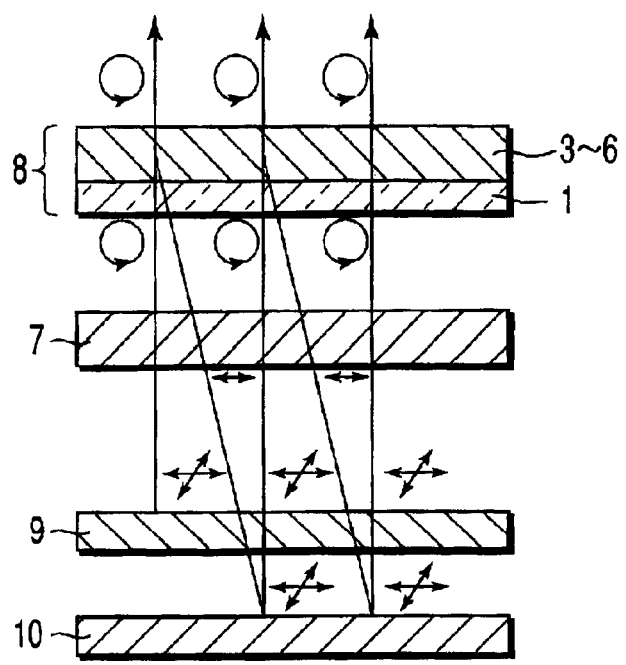
FIG. 3 is a conceptual diagram for illustrating the function of the polarized light reflecting element.

The following is a description of the function of the polarized light reflecting element 8 of the present embodiment. In the description to follow, a left-handed circular polarization plate 7, planar light source 9, reflecting plate 10 are arranged in succession on one side of the polarized light reflecting element 8, e.g., on the side of the transparent substrate 1, as shown in FIG. 3.

In this case, incident light from the left-handed circular polarization plate 7 is converted into left-handed circularly polarized light by means of the polarization plate 7 and reaches the polarized light reflecting element 8. In this left-handed circularly polarized light, 60 to 70% of light in a wavelength region near the respective selective reflection wavelengths λ3 to λ6 of the cholesteric liquid crystal layers 3 to 6 is alternatively reflected by means of the layers 3 to 6. On the other hand, 30 to 40% of the light that is not reflected by the cholesteric liquid crystal layers 3 to 6 is directly transmitted and emitted from the polarized light reflecting element 8.

As described above, the liquid crystal molecules in the top and bottom portions of the cholesteric liquid crystal layers 3 to 6 are oriented uniformly, and their helix angle is nπ (n=1, 2, 3, . . . ), so that each layer has a symmetrical structure with respect to the helical axis of the liquid crystal molecules. Thus, the left-handed circularly polarized light that is transmitted through the cholesteric liquid crystal layers 3 to 6 can be emitted directly from the polarized light reflecting element 8 without being disturbed in its polarized state. In consequence, the light emitted from the reflecting element 8 has a very high degree of circular polarization.

On the other hand, the light reflected by the cholesteric liquid crystal layers 3 to 6 returns to the light source 9 through the left-handed circular polarization plate 7. If the reflecting plate 10 is located behind the light source 9, the light reflected by the polarized light reflecting element 8 is reflected by the reflecting plate 10 and landed again on the reflecting element 8. Thereafter, the same processes as aforesaid are repeated.

Thus, with use of the polarized light reflecting element 8, 70% or more of the light emitted from the light source 9 can be obtained as the left-handed circularly polarized light.

Preferably, the respective helix angles of the liquid crystal molecules of each of the cholesteric liquid crystal layers 3 to 6 should be equalized at nπ (n=1, 2, 3, . . . ), as mentioned before. In actual manufacture, however, the helix angles may be subject to some dispersion.

Figure 4:
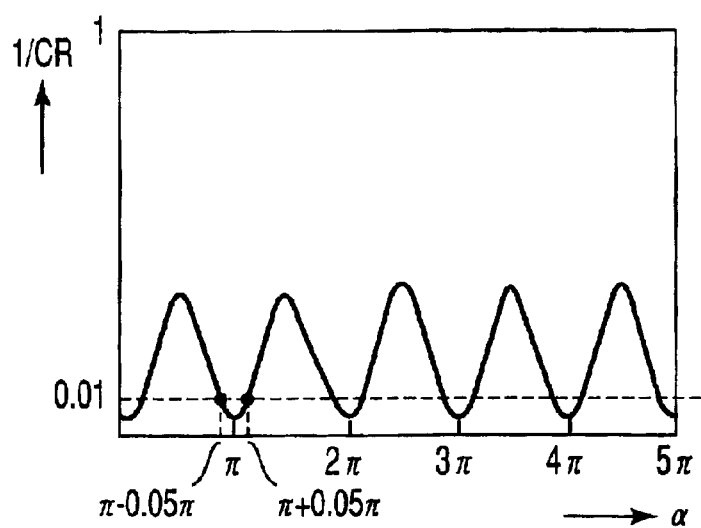
FIG. 4 is a diagram showing the relationship between the helix angle of the cholesteric liquid crystal layer and the contrast of the polarized light reflecting element.

FIG. 4 shows the relationship between the in-plane mean value α of the helix angles and the ratio (1/CR) between the right- and left-handed circularly polarized light components of the emitted light. As seen from FIG. 4, 1/CR has a minimum value that ensures satisfactory display when the mean value α is an integral multiple of π. If the mean value α deviates from the range of nπ±0.05π (n: integer), 1/CR is 0.01 or more (contrast ratio at 100 or less), so that the quality level of display is very low. Thus, the in-plane mean value α of the helix angles must be set within the range, nπ−0.05π≦α≦nπ+0.05π.

Ideally, moreover, all the liquid crystal molecules in the top portion of each of the cholesteric liquid crystal layers 3 to 6 should be oriented in the same direction. However, the effect of the present embodiment can be obtained without necessarily orienting the liquid crystal molecules in this manner. In this case, the cholesteric liquid crystal layer on the underlying cholesteric liquid crystal layer is formed so that the liquid crystal molecules in its bottom portion are oriented in the same direction with the liquid crystal molecules of the underlying cholesteric liquid crystal layer. By doing this, the stacked cholesteric liquid crystal layers are arranged so that their liquid crystal molecules are oriented continuously and have one smooth helical structure as a whole. Thus, disturbance of the polarized state of the emitted light can be minimized.

The following is a description of a liquid crystal display element according to a second embodiment of the invention. This liquid crystal display element is constructed as a half-transmission-type liquid crystal display element that utilizes the polarized light reflecting element according to the first embodiment.

Figure 5A:
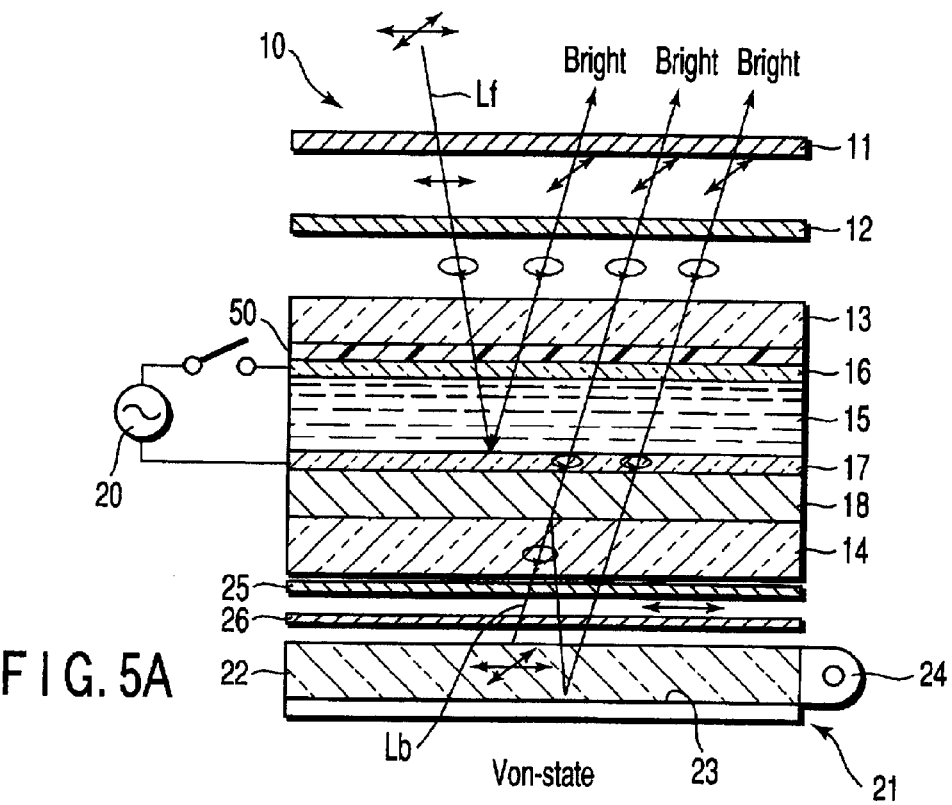
FIG. 5A is a sectional view diagrammatically showing a state in which a first voltage is applied to the liquid-crystal side of a liquid crystal display element according to a second embodiment of the invention.
Figure 5B:
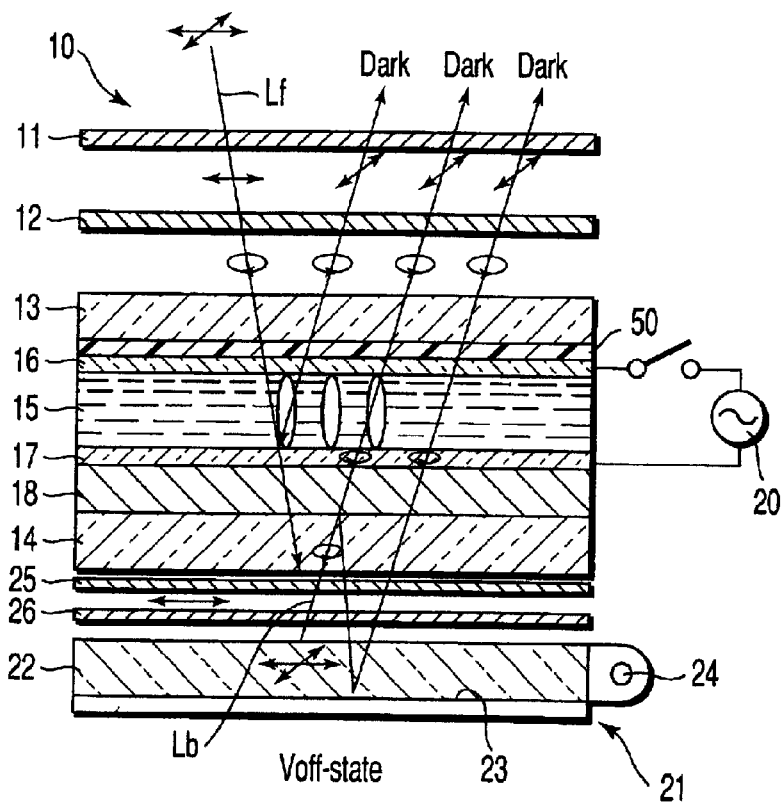
FIG. 5B is a sectional view diagrammatically showing a state in which a second voltage is applied to the liquid-crystal side of the liquid crystal display element according to the second embodiment.
Figure 6:
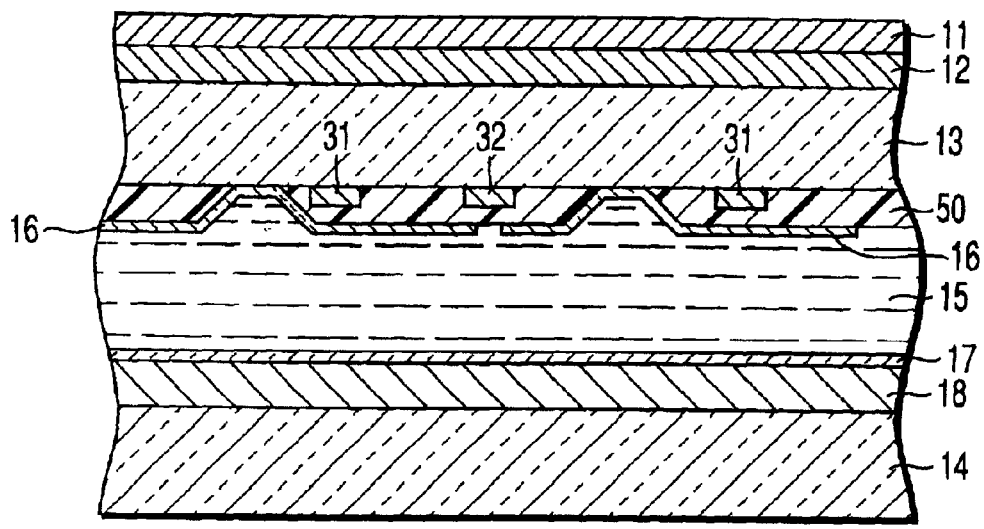
FIG. 6 is a sectional view of the liquid crystal display element.

As shown in FIGS. 5A, 5B and 6, the liquid crystal display element is provided with a liquid crystal, which includes a liquid crystal layer 15 sandwiched between two glass substrates 13 and 14 that are opposed to each other. A λ/4-wavelength plate 12 and a polarization plate 11 are successively provided on the view side of the liquid crystal, that is, on the outer surface of the glass substrate 13. The λ/4-wavelength plate 12 and the polarization plate 11 jointly constitute a right-handed circular polarization plate that has a right-handed circular polarization characteristic.

Further, a λ/4-wavelength plate 25, a polarization plate 26, and a backlight source 21 are successively provided facing the outer surface of the other glass substrate 14. The λ/4-wavelength plate 25 and the polarization plate 26 jointly constitute a left-handed circular polarization plate that has a left-handed circular polarization characteristic.

The view-side glass substrate 13 of the liquid crystal constitutes an array substrate. A color filter layer 50 is provided on the inner surface of the glass substrate 13, and a large number of pixel electrodes 16 of transparent ITO are arranged in a matrix on the color filter layer.

Figure 7:
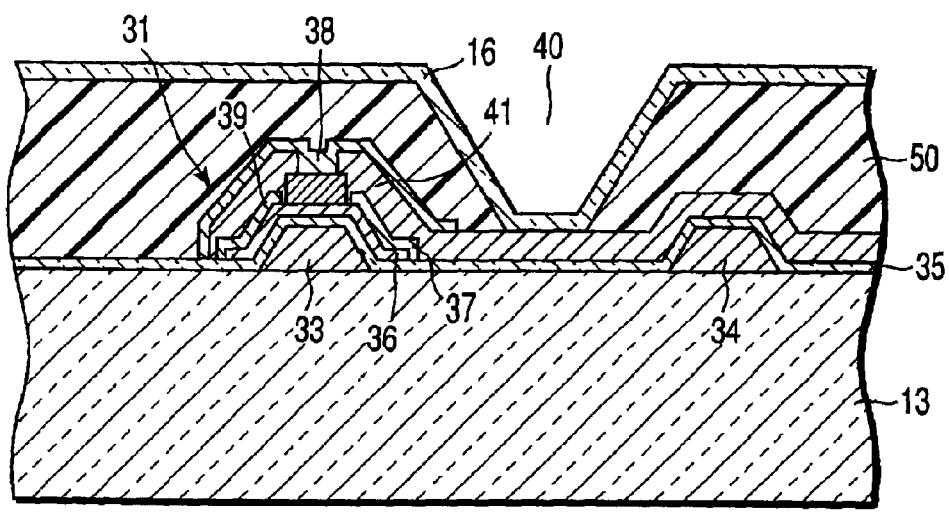
FIG. 7 is an enlarged sectional view showing an array substrate of the liquid crystal display element.

As shown in FIGS. 6 to 8, signal lines 32 and scanning lines 34 that include gate electrodes 33 are arranged in a matrix on the glass substrate 13, and auxiliary capacity electrodes (not shown) are provided as required. Thin-film transistors (hereinafter referred to as TFT's) 31 for use as switching elements are connected individually on the intersections of the signal lines 32 and the scanning lines 34, and are connected to the pixel electrodes 16, individually. An oxide film 35 is put on the signal lines 32 and the scanning lines 34.

Each TFT 31 is provided with a semiconductor film 36 of amorphous silicon (a-Si), which is formed over the gate electrode 33 with the oxide film 35 between them, and a source electrode 41 and a drain electrode 39 that are arranged over the film 36 with a low-resistance semiconductor film 37 between them. A passivation film 38 covers the resulting structure.

In the TFT 31 with a bottom-gate structure such that the gate electrode 33 is located under the semiconductor film 36, outdoor light from the array substrate 13 that is landed on the TFT 31 is intercepted by the gate electrode 33, so that it cannot be incident upon the semiconductor film 36. In consequence, lowering of the contrast ratio, which is attributable to the optical leak current that is generated by light when the liquid crystal display element is used outdoors, can be prevented.

Each pixel electrode 16 is connected to the source electrode 41 through a contact hole 40 about 10 μm square that is formed in the color filter layer 50. The color filter layer 50 is formed of color filter layers of the three primary colors, red, green, and blue, or the three primary complementary colors, yellow, magenta, and cyan. Color display based on additive mixture of color stimuli is carried out under electrolytic control of the pixels of the liquid crystal layer 15 by means of the matrix-shaped pixel electrodes 16 and an opposed electrode 17. Any of the signal lines 32, scanning lines 34, and auxiliary capacity lines are located on the boundaries between the pixel electrodes 16, and never allow light to leak from the backlight source 21 and lower the contrast ratio when transmitted light from the backlight source is used.

As shown in FIG. 6, on the other hand, the glass substrate 14 on the backside of the liquid crystal constitutes an opposed substrate. The opposed electrode 17 of a transparent conductive film such as ITO is formed substantially covering the whole surface of the glass substrate 14 that faces the pixel electrodes 16. A selective reflection layer 18, which is formed of stacked cholesteric liquid crystal layers having the same configuration with the polarized light reflecting element according to the first embodiment, is sandwiched between the glass substrate 14 and the opposed electrode 17.

Preferably, the opposed electrode 17 should be formed and patterned simultaneously by the conventional mask sputtering method. As the opposed electrode 17 is formed, in this case, process load on the cholesteric liquid crystal layers that constitute the selective reflection layer 18 can be lowered extremely.

Further, oriented films (not shown) are formed individually on those surfaces of the array substrate 13 and the opposed substrate 14 which are in contact with the liquid crystal layer 15. These oriented films have their respective directions of orientation such that the liquid crystal molecules of the liquid crystal layer 15 are oriented at right angles to the substrate. Thus, a large number of liquid crystal pixels are arranged in a matrix between the array substrate 13 and the opposed substrate 14.

As shown in FIG. 8, moreover, the array substrate 13 and the opposed substrate 14 are stuck on each other by means of a sealing material 43 that is spread along a peripheral edge portion (sealing portion) 42 of each substrate. If the sealing material 43 is spread over the selective reflection layer 18 of the opposed substrate 14, its adhesion is so poor that the substrates may possibly be separated from each other after prolonged use of 10,000 hours or more, thus failing to ensure reliability.

Lowering of reliability can be avoided if an overcoat that is highly adhesive to the sealing material 43 is spread over the selective reflection layer 18 and used to facilitate the application of the sealing material to the layer 18. For example, any of acrylic resins that serve for conventional color filters may be used for the overcoat.

As shown in FIGS. 5A and 5B, the backlight source 21 that is located on the backside of the glass substrate 14 includes a photoconductor 22 formed of a light-transmitting flat plate of an acrylic resin or the like, a linear light source 24 located on the flank of the photoconductor, and a scattering reflection layer 23 on the underside of the photoconductor.

Although the driving element for driving the liquid crystal is formed of the TFT of a-Si according to the present embodiment, it may alternatively be formed of a two-terminal element such as an MIM or an element that uses p-Si. Further, the electrodes are not limited to the aforementioned active-matrix type, and may alternatively be of the simple-matrix type.

The following is a description of the operation of the liquid crystal display element constructed in this manner.

When the liquid crystal layer 15 of the vertical-orientation type is in an on-state such that it is supplied with a voltage from a power source 20 or when it is supplied with a voltage not lower than the threshold value for the liquid crystal (or in a Von-state), more accurately, as shown in FIG. 5A, the nematic liquid crystal molecules are homogeneously oriented so that they are arranged ranging from the array substrate 13 to the opposed substrate 14 and parallel to the substrates.

In this state, incident light Lf from the view side or the topside of FIG. 5A is transmitted through the polarization plate 11 and the $\lambda/4$-wavelength plate 12 and landed as right-handed circularly polarized light on the liquid crystal layer 15. As its phase is delayed by $\lambda/2$ by means of the liquid crystal layer 15, the light is converted into left-handed circularly polarized light and reaches the selective reflection layer 18. Thus, the landed left-handed circularly polarized light is reflected by the selective reflection layer 18. As its phase is delayed again by $\lambda/2$ by means of the liquid crystal layer 15, the light is converted into right-handed circularly polarized light and delivered to the view side. As the light is transmitted again through the $\lambda/4$-wavelength plate 12, it becomes linear polarized light along the polarization axis of the polarization plate 11, and is delivered to the outside through the polarization plate 11. Thus, bright display is obtained.

When the liquid crystal layer 15 is in an off-state (including the zero-voltage state) such that its is supplied with a voltage lower than the threshold value (or in a Voff-state), as shown in FIG. 5B, its liquid crystal molecules are arranged at right angles to the glass substrates 13 and 14, so that phase of the incident light cannot be modulated.

In this state, as in the Von-state, the incident light from the topside of FIG. 5B is transmitted through the polarization plate 11 and the $\lambda/4$-wavelength plate 12 and landed as right-handed circularly polarized light on the liquid crystal layer 15. However, the right-handed circularly polarized light directly reaches the selective reflection layer 18 without having its phase modulated by the liquid crystal layer 15. Accordingly, the right-handed circularly polarized light is transmitted to the backside through the selective reflection layer 18, and is converted by means of the $\lambda/4$-wavelength plate 25 into linear polarized light that has vibration components along the absorption axis of the polarization plate 26. In consequence, the incident light Lf never returns to the view surface, so that dark display is obtained.

The following is a description of operation for the case where the backlight source 21 on the backside of the selective reflection layer 18 is activated. In the Von-state shown in FIG. 5A, light Lb emitted from the backlight source 21 is converted into left-handed circularly polarized light by means of the polarization plate 26 and the $\lambda/4$-wavelength plate 25. Some components (30 to 40% in the present embodiment) of the light are transmitted through the selective reflection layer 18, while the remaining components are reflected by the layer 18.

The light transmitted through the selective reflection layer 18 is subjected to phase modulation by means of the liquid crystal layer 15 and converted into right-handed circularly polarized light. As this light is transmitted through the $\lambda/4$-wavelength plate 12, it becomes linear polarized light along the polarization axis of the polarization plate 11, and is delivered to the view-surface side through the polarization plate. As mentioned before, the light transmitted through the selective reflection layer 18 in the aforesaid process is the left-handed circularly polarized light that is highly polarized and hardly contains any right-handed circularly polarized light components. Thus, the light utilization factor is high enough to obtain a high-luminance bright display.

In the Voff-state shown in FIG. 5B, on the other hand, the left-handed circularly polarized light transmitted through the selective reflection layer 18 is directly delivered to the view side without undergoing phase modulation by means of the liquid crystal layer 15. As this light is transmitted through the $\lambda/4$-wavelength plate 12, it becomes linear polarized light that vibrates at right angles to the polarization axis of the polarization plate 11, and is absorbed by the polarization plate 11. Since the light transmitted through the selective reflection layer 18 hardly contains any right-handed circularly polarized light components for the aforesaid reason, very little light is leaked and emitted from the polarization plate 11. Thus, a dark display with nearly zero luminance is obtained.

According to the liquid crystal display element constructed in this manner, the selective reflection layer 18 can obtain a high degree of circular polarization, as in the case of the first embodiment. Thus, the liquid crystal display element using this selective reflection layer can enjoy a high contrast and satisfactory display performance.

In the above description of the present embodiment, the $\lambda/4$-wavelength plates 12 and 25 and the polarization plates 11 and 26 are able to function as perfect circular polarization plates. Actually, however, films with different wavelength dispersions may be used for these plates. In this case, the combination of the phase-difference plate 12 and the polarization plate 11 serves as a right-handed elliptic polarization plate, and the combination of the phase-difference plate 25 and the polarization plate 26 as a left-handed elliptic polarization plate.

According to the arrangement described above, the display performance of the liquid crystal display element varies depending on the directions of the respective optical axes (axes of ellipses) of the elliptic polarization plates and the liquid crystal molecules in the selective reflection layer 18 and the liquid crystal layer 15. To obtain better contrast, it is necessary only that transmittance T be measured by rotating the right- and left-handed elliptic polarization plates and be minimized in the Voff-state.

FIG. 9 shows the relationship between the Voff-state transmittance T obtained from the liquid crystal display element according to the present embodiment and the absorption axis angle of the polarization plate 11. In the case of the present embodiment, as seen from FIG. 9, the transmittance T is minimized to ensure the highest display quality level when the absorption axis of the polarization plate 11 is inclined at 45°.

The following is a description of a liquid crystal display element according to a third embodiment of the invention. As shown in FIG. 10, the liquid crystal display element of the present embodiment is constructed so that a $\lambda/4$- wavelength plate 51 and a polarized light reflecting element 52 are further located between the polarization plate 26 and the backlight source 21 of the liquid crystal display element according to the second embodiment.

The polarized light reflecting element 52 may be one that is manufactured in the same manner as the one according to the first embodiment. Preferably, however, the reflection-transmission ratio of the specific circularly polarized light components (left-handed circularly polarized light components in this case) of the reflecting element should be approximately 10:0.

For other configurations, the liquid crystal display element according to the third embodiment resembles the one according to the second embodiment. Therefore, like reference numerals are used to designate like portions of the second and third embodiments, and a detailed description of those portions is omitted.

According to the liquid crystal display element of the third embodiment constructed in this manner, right-handed circularly polarized light components of light emitted from the backlight source 21 are transmitted through the polarized light reflecting element 52, while left-handed circularly polarized light components are reflected and returned to the backlight source 21. The light returned to the backlight source 21 is reflected scatteringly, depolarized, and landed again on the polarized light reflecting element 52. Accordingly, the right-handed circularly polarized light components are transmitted again, while the left-handed circularly polarized light components are reflected. Thus, only the right-handed circularly polarized light components are transmitted through the polarized light reflecting element 52 as the light is reflected a plurality of times between the reflecting element 52 and the backlight source 21.

The right-handed circularly polarized light transmitted through the polarized light reflecting element 52 becomes is converted into linear polarized light by means of the $\lambda/4$-wavelength plate 51 and directed to the polarization plate 26. If the direction of the linear polarized light transmitted through the $\lambda/4$-wavelength plate 51 is aligned with the transmission axis of the polarization plate 26, in this case, almost all the light components can be transmitted through the polarization plate 26 to be utilized for the display of the liquid crystal display element.

Since the polarized light reflecting element 52 exhibits very good circular-polarization dichromatism, as mentioned before, the light utilization factor of the liquid crystal display element with the above-described construction is very high. A conventional liquid crystal display element that is not provided with the polarized light reflecting element 52 can utilize only 50% or less of the light emitted from the oriented film 2 for display, while the liquid crystal display element according to the present embodiment can utilize 70% or more.

For a half-transmission-type liquid crystal display element to which the light utilization factor is essential, in particular, its display performance can be drastically improved by combining the polarized light reflecting element with the half-transmission-type liquid crystal display element of the second embodiment, as in the case of the present embodiment. The light utilization factor of the half-transmission-type liquid crystal display element of the present embodiment is about 1.6 times as high as that of the conventional one.

It is to be understood that the present invention is not limited to the embodiments described above, and that various changes and modifications may be effected therein by one skilled in the art without departing from the scope or spirit of the invention.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

According to any of the foregoing embodiments, for example, the polymerized cholesteric liquid crystal layers are used as the components of the polarized light reflecting element. Alternatively, however, polymerized chiral-nematic or chiral liquid crystal layer may be used for the purpose. In the above description, "layer" is supposed also to imply the concept of "film."

Although the half-transmission-type liquid crystal display element has been described in connection with each of the second and third embodiments, the present invention may be applied to a transmission-type liquid crystal display element with the same effect. In this case also, it is necessary only that the same polarized light reflecting element and $\lambda/4$-wavelength plate as those of the present embodiment be located between the backlight source and the polarization plate on the back of a liquid crystal panel of the conventional transmission-type liquid crystal display element.

What is claimed is:

1. A polarized light reflecting element comprising:
   at least one polymerized liquid crystal layer, cholesteric, chiral-nematic, or chiral, having a helical liquid crystal molecule array and a helical axis extending substantially in the normal direction,
   the in-plane mean value $\alpha$ of the respective helix angles of the liquid crystal molecules being given by $n\pi-0.05\pi \leq \alpha \leq n\pi+0.05\pi$ (n=1, 2, 3, ...).

2. A polarized light reflecting element according to claim 1, wherein a plurality of said liquid crystal layers with different helix pitches are stacked so that the liquid crystal molecules are continuously oriented on the interfaces between the liquid crystal layers and that one smooth helical structure is formed as a whole.

3. A polarized light reflecting element according to claim 2, wherein the mean value $\alpha$ of the respective helix angles of the liquid crystal molecules of each said liquid crystal layer is given by $n\pi-0.05\pi \leq \alpha \leq n\pi+0.05\pi$ (n=1, 2, 3, ...).

4. A polarized light reflecting element according to claim 1, wherein each of said liquid crystal layers has a helical liquid crystal molecule array and a thickness such that the layer reflects some of specific circularly polarized light components of incident light and transmits the remainder of the specific circularly polarized light components not reflected and almost all other light components other than the specific circularly polarized light components.

5. A polarized light reflecting element according to claim 4, wherein the ratio between the reflected and transmitted ones of the specific circularly polarized light components ranges from 5:5 to 9:1.

6. A half-transmission-type liquid crystal display element comprising:
   a first polarization plate;
   a liquid crystal cell;
   a second polarization plate; and
   the polarized light reflecting element according to claim 1 located between the first and second polarization plates.

7. A half-transmission-type liquid crystal display element according to claim 6, wherein the first and second polarization plates have reverse circular polarization characteristics, and the polarized light reflecting element and the first and second polarization plates are located in a manner such that the transmittance of the polarized light reflecting element is at a minimum when the respective optical axes of the first and second polarization plates are rotated individually.

8. A liquid crystal display element comprising:

a first polarization plate;

a liquid crystal cell;

a second polarization plate;

a backlight source;

the polarized light reflecting element according to claim 1 located between the second polarization plate and the backlight source; and a $\lambda/4$-wavelength plate located between the second polarization plate and the polarized light reflecting element.

* * * * *